J. C. WATERS.
PLOW.
APPLICATION FILED MAR. 6, 1919.
1,309,498.
Patented July 8, 1919.
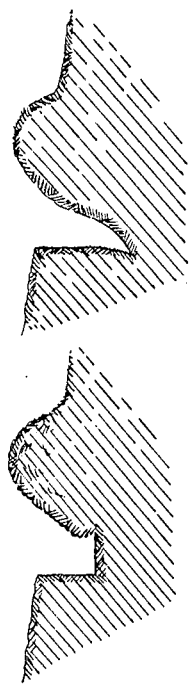
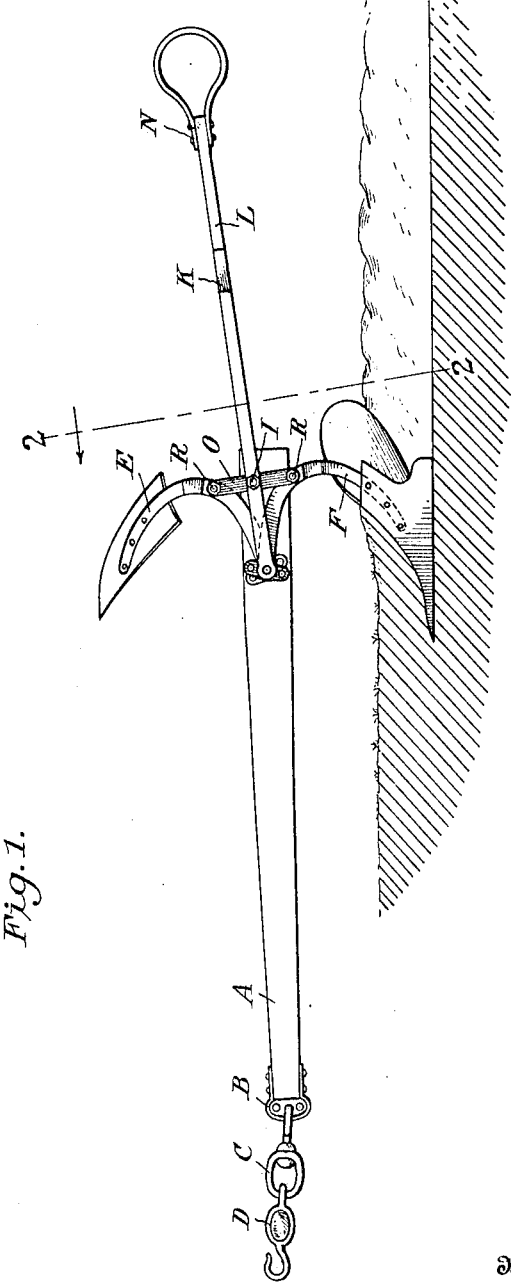
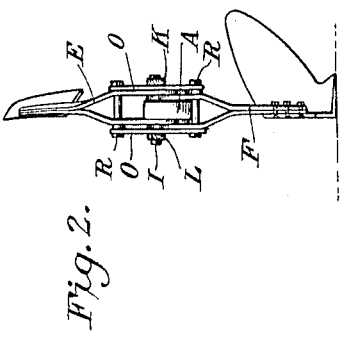
Inventor
J. C. WATERS.
By Franklin H. Hough
Attorney

UNITED STATES PATENT OFFICE.

JOHN CALVIN WATERS, OF EPWORTH, GEORGIA.

PLOW.

1,309,498.  Specification of Letters Patent.  Patented July 8, 1919.

Application filed March 6, 1919. Serial No. 280,924.

*To all whom it may concern:*

Be it known that I, JOHN C. WATERS, a citizen of the United States, residing at Epworth, in the county of Fannin and State of Georgia, have invented certain new and useful Improvements in Plows; and I do hereby declare the following to be a full, clear, and exact description of the invention, such as will enable others skilled in the art to which it appertains to make and use the same, reference being had to accompanying drawings, and to the letters and figures of reference marked thereon, which form a part of this specification.

This invention relates to new and useful improvements in combination turning and sub-soil plows, and consists of a simple and efficient device of this character, so arranged that when a furrow is turned the plow may be reversed and the sub-soiler made to deepen the furrow when returning in the same furrow.

The invention consists of a simple and efficient device of this nature which will be hereinafter fully described, shown in the accompanying drawings and then specifically defined in the appended claim.

My invention is illustrated in the accompanying drawings which, with the letters of reference marked thereon, form a part of this application and in which:

Figure 1 is a side elevation of my improved combination plow.

Fig. 2 is a sectional view on line 2—2 of Fig. 1.

Fig. 3 is a detail view showing the furrow cut by the first plow, and

Fig. 4 is a similar view of the furrow as it would appear after the subsoil plow has passed through.

Reference now being had to the details of the drawings by letter:

A designates a plow having a clevis B, fastened thereto and to which a ring C is swiveled, and to which a whiffletree D is adapted to be connected. The plow and sub-soiler are designated respectively by letters E and F, and each has a slotted shank portion adapted to straddle the beam to which they are pivotally connected through the medium of the bolt I. Handles, designated by letters K and L are pivotally connected at their forward ends to the bolt I.

Braces O are fastened at their ends by bolts R to the shank portion of the plow and subsoiler and each to a handle, as shown in Fig. 2 of the drawings. The ends of the plow and sub-soiler standard, which are pivoted to the beam, are provided with a plurality of apertures whereby the angles at which it is desired to have the plow and subsoiler secured relative to the beam may be adjusted.

In operation, when it is desired to cut the furrow through the medium of the plow E, the parts are adjusted so that the plow E will be in the position shown in Fig. 1 of the drawings. The first furrow having been turned, the plow beam may be reversed, the said beam being swiveled, in order to bring the subsoiler into the bottom of the furrow already turned, and by drawing the plow back through the furrow, the latter may be deepened in the manner shown in Fig. 4 of the drawings.

By the construction of a plow made in accordance with my invention, it will be noted that the beam may have a swinging movement between the shank portions of the plow and subsoiler, the limit of the tilting movement being determined by the bolts R against which the beam is adapted to strike when tilted to its limit in one direction or the other.

By the provision of a turning plow and subsoiler made in accordance with my invention, it will be noted that with the two turners right and left, the ground may be turned down hill all the time and with the turner plow and subsoiler one turn may be plowed going one way and the subsoiler returning, always turning the soil in one direction or down hill. On the level ground the operator may plow around the land and then reverse the plow, subsoiling the same, as will be readily understood. By the provision of this apparatus one implement may be used for the purpose heretofore requiring two.

What I claim to be new is:

A combination turning plow and subsoiler, comprising a beam with a clevis swiveled thereto, a turning plow and a subsoiler, each having a slotted standard adapted to straddle the beam, pivotal pins passing through registering apertures in the wall of each slotted standard, links pivotally connected to said pins, a forked handle pivotally connected to the pivot upon which said standards are mounted, and each arm being pivoted to the adjacent ends of links upon either side of the beam, said pins which pivotally connect the standards to said links tending to limit the movement of the beam in one direction or the other.

In testimony whereof I hereunto affix my signature in presence of two witnesses.

JOHN CALVIN WATERS.

Witnesses:
J. M. WATERS,
MOLLIE CHASTAIN.

Copies of this patent may be obtained for five cents each, by addressing the "Commissioner of Patents, Washington, D. C."